(12) United States Patent
Jochman

(10) Patent No.: US 12,212,215 B2
(45) Date of Patent: Jan. 28, 2025

(54) POWER SYSTEMS HAVING AXIALLY CLAMPED FANS

(71) Applicant: Illinois Tool Works Inc., Glenview, IL (US)

(72) Inventor: Nathan Joe Jochman, Neenah, WI (US)

(73) Assignee: Illinois Tool Works Inc., Glenview, IL (US)

( * ) Notice: Subject to any disclaimer, the term of this patent is extended or adjusted under 35 U.S.C. 154(b) by 246 days.

(21) Appl. No.: 17/678,756

(22) Filed: Feb. 23, 2022

(65) Prior Publication Data

US 2023/0268803 A1    Aug. 24, 2023

(51) Int. Cl.
*H02K 5/20* (2006.01)
*H02K 7/00* (2006.01)
*H02K 7/14* (2006.01)
*H02K 9/06* (2006.01)

(52) U.S. Cl.
CPC .............. *H02K 9/06* (2013.01); *H02K 5/207* (2021.01); *H02K 7/003* (2013.01); *H02K 7/14* (2013.01)

(58) Field of Classification Search
CPC ........ H02K 7/1815; H02K 7/14; H02K 7/003; H02K 7/116; H02K 9/06; H02K 5/207; F01D 15/10; F02C 7/277; F02C 7/06; F02C 7/18; F02C 7/20
See application file for complete search history.

(56) References Cited

U.S. PATENT DOCUMENTS

2020/0173356 A1*  6/2020  Blank ................... F02B 63/044

\* cited by examiner

*Primary Examiner* — Bryan R Perez
(74) *Attorney, Agent, or Firm* — McAndrews, Held & Malloy, Ltd.

(57) ABSTRACT

Disclosed power systems include an engine configured to output mechanical power via an engine shaft, a generator, and a fan. The generator includes a rotor shaft coupled to a rotor assembly and is configured to be coupled to the engine shaft via a threaded connection. One of the engine shaft or the rotor shaft includes an outer diameter thread and the other of the engine shaft or the rotor shaft comprises an inner diameter thread to form the threaded connection. The fan includes a first aperture configured to receive one of the engine shaft or the rotor shaft. The threaded connection is configured to axially compress the fan between the one of the engine shaft and the rotor shaft having the inner diameter threads of the threaded connection and an abutting surface on the one of the engine shaft or the rotor shaft having the outer diameter threads of the threaded connection, such that the fan rotates to generate an airflow through the generator when the engine shaft turns the rotor shaft.

11 Claims, 5 Drawing Sheets

POWER SYSTEMS HAVING AXIALLY CLAMPED FANS

FIELD OF THE DISCLOSURE

This disclosure relates generally to engine-driven power systems and, more particularly, to power systems having axially clamped fans.

BACKGROUND

Conventionally, engine-driven power systems (e.g., generators/air compressors/welders) are contained within a metal enclosure that provides environmental protection for the equipment and provides a safety, sound, and aesthetic barrier for the operators. Many different types of enclosures have been used for conventional power systems. Conventional enclosures are configured with components in such a way as to house the engine and/or generator components based on their relative locations. Moreover, enclosures typically include one or more cooling fans to circulate air and cool the engine and/or generator components.

SUMMARY

Power systems having an axially clamped fans are disclosed, substantially as illustrated by and described in connection with at least one of the figures.

BRIEF DESCRIPTION OF THE DRAWINGS

The figures are not necessarily to scale. Where appropriate, similar or identical reference numbers are used to refer to similar or identical components.

DETAILED DESCRIPTION

Figure 1:
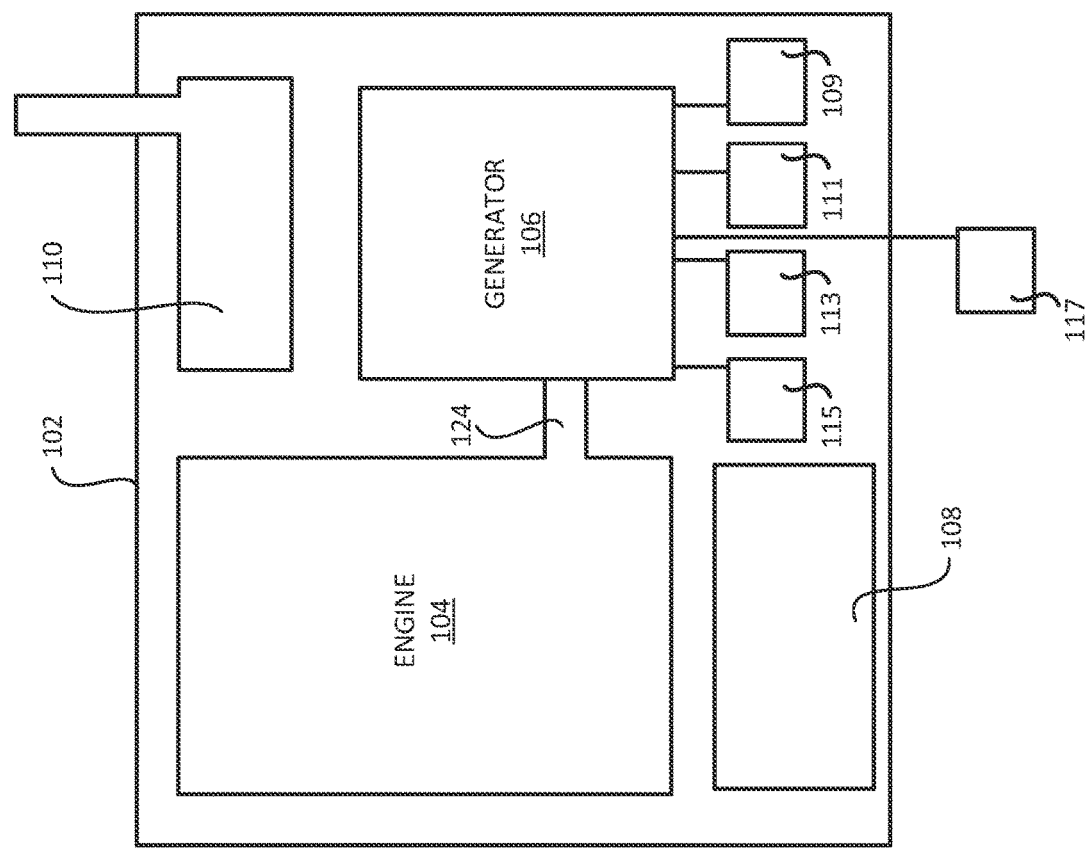
FIG. 1 is a block diagram of an example power system, in accordance with aspects of this disclosure.

Engine-driven power systems, which generate and output one or more types of mechanical, electrical, pneumatic, hydraulic, and/or other types of power, rely on circulating air through an enclosure to cool one or more components within the enclosure. For example, a fan may be used to circulate air to cool an engine and/or a generator component within the enclosure of the power system. In conventional power systems, the fan is coupled to a rotor shaft of the generator, which is typically a larger diameter than the engine shaft to which the rotor shaft is coupled. Conventional power systems use a press fit to couple the fan to the rotor shaft. In order for the fan to properly couple to the rotor shaft via a press fit, the dimensions of the fan and the rotor shaft need to be precise. The tight tolerances required between the fan and the rotor shaft to achieve a proper press fit increases the manufacturing time and cost associated with fabricating the components and leaves less room for even minor errors in the manufacturing process. Moreover, in many cases in which a press fit is used to couple the fan to the rotor shaft, a press has to be used in the manufacturing process to achieve the press fit coupling between the components. This further increases the time and cost associated with assembling a conventional power system.

Additionally, conventional power systems may be more costly and time consuming to repair if the fan breaks. For example, because the fan is coupled to the rotor shaft via a press fit, the fan cannot be easily removed from the rotor shaft. Thus, if the fan breaks and needs to be sent out for repair, the rotor assembly including the rotor shaft typically has to be sent out along with the fan. In this way, shipping and handling costs may be increased. Similarly, if the rotor assembly is damaged and needs to repaired, the fan will likewise have to be removed from the power system while coupled to the rotor shaft to repair the rotor assembly. Because many fans are made of plastic or another relatively easily broken material, removing the rotor assembly from the power system, shipping the rotor assembly, or otherwise handling the rotor assembly may increase the risk of the fan coupled to the rotor shaft breaking, further increasing costs and downtime associated with the power system. If either the fan or the rotor assembly is broken and incapable of repair, both the fan and rotor assembly may need to be replaced in the power system. This, too, increases costs, waste, and downtime associated with the power system.

Disclosed example power systems are provided with an improved fan in which the fan does not have the drawbacks discussed above with respect to being press fit to the rotor shaft or another component. Instead, disclosed example power systems enable mounting of the fan using a clearance fit, and providing axial compression between the rotor shaft and the motor shaft to impart rotation on the fan. By mounting the fan using a clearance fit, the fan may be removably coupled to the corresponding shaft within the power system. In this way, disclosed example power systems enable cheaper and/or less time-consuming manufacturing of the fan and the component (e.g., the rotor shaft, the engine shaft, etc.) to which the fan is coupled. Additionally, or alternatively, the manufacturing process of the fan and the component to which the fan is to be coupled allows less stringent tolerances without posing problems during assembly of the power system (as compared to components to be coupled via a press fit).

Furthermore, because disclosed example fans are removably coupled to another component of the power system (e.g., the rotor shaft, the engine shaft, etc.), the fan and/or the other component can be easily separated, such as to be sent out for repair, replacement, or the like. In other words, repairing or replacing one of the fan or the rotor shaft or engine shaft does not require the other of the component or the fan to also be sent out for repair, repaired, replaced, or the like. Disclosed example power systems may lower the total assembly cost of the power system, may have fewer complex individual parts, may be easier to assemble, may be more serviceable, and/or may have fewer quality issues in manufacturing in comparison to conventional power systems.

FIG. 1 is a block diagram of an example power system 100. The power system 100 may be used for various applications, such as, for example, providing compressed air, generating power, pumping, and/or welding support. As illustrated in FIG. 1, the power system 100 includes an enclosure 102. The enclosure 102 protects internal components of the power system 100 from the environment, as well as providing a safety, sound, and aesthetic barrier for an operator using or within range of the power system 100. The enclosure 102 is primarily constructed with sheet metal, and may include multiple panels. One or more of the panels may be removable and/or one or more of the panels may open to permit access.

The example power system 100 of FIG. 1 is an engine-driven power system. The system 100 includes an engine 104 that drives a generator 106 to generate electrical power. The engine 104 may be an internal combustion engine, a diesel engine, a fuel cell, etc. The engine 104 is configured to output mechanical power to drive the generator 106. The engine 104 receives fuel from a fuel tank 108.

In some examples, the power system 100 includes one or more power subsystems. For example, the generator 106 may provide the electrical power to welding-type conversion circuitry 109 configured to output welding-type power, an air compressor 111 configured to output pneumatic power, a hydraulic pump 113 configured to output hydraulic power, auxiliary power conversion circuitry 115 configured to output AC power and/or DC power (e.g., DC and/or AC electrical output(s)), and/or any other load device. The example hydraulic pump 113 and the air compressor 111 may be powered by mechanical power from the engine 104 and/or by electrical power from the generator 106.

In some examples, an external power supply subsystem 117 may be coupled (e.g., plugged in, hardwired, etc.) to the power system 100 to convert at least one of the AC power or the DC power from the auxiliary power conversion circuitry 115 and/or the generator 106 to at least one of AC power or DC power, such as to power external devices that have different power requirements. The example external power supply subsystem 117 may also be communicatively coupled to control circuitry of the power system 100 (e.g., wirelessly, via power line communication, via a communication cable, etc.) to enable the control circuitry to control the demand and/or output of the external power supply subsystem 117.

The welding-type conversion circuitry 109 converts output power from the generator 106 (e.g., via the intermediate voltage bus) to welding-type power based on a commanded welding-type output. The welding-type conversion circuitry 109 provides current at a desired voltage to an electrode and a workpiece via output terminals to perform a welding-type operation. The welding-type conversion circuitry 109 may include, for example, a switched mode power supply or an inverter fed from an intermediate voltage bus. The welding-type conversion circuitry 109 may include a direct connection from a power circuit to the output (such as to the weld studs), and/or an indirect connection through power processing circuitry such as filters, converters, transformers, rectifiers, etc.

The auxiliary power conversion circuitry 115 converts output power from the generator 106 (e.g., via the intermediate voltage bus) to AC power (e.g., 120 VAC, 240 VAC, 50 Hz, 60 Hz, etc.) and/or DC power (e.g., 12 VDC, 24 VDC, battery charging power, etc.). The auxiliary power conversion circuitry 115 outputs one or more AC power outputs (e.g., AC outlets or receptacles) and/or one or more DC power outputs (e.g., DC outlets or receptacle). The power system 100 enables multiple ones of the power subsystems (e.g., the hydraulic pump, the air compressor 111, the welding-type conversion circuitry 109, the auxiliary power conversion circuitry 115, the external power supply subsystem 117, etc.) to be operated simultaneously.

In some examples, the power system 100 includes a user interface 119. The user interface 119 includes an input device configured to receive inputs selecting mode(s) representative of welding-type processes, mode(s) representative of one or more battery charging modes, mode(s) representative of a vehicle load, and/or other modes such as a pneumatic load and/or a hydraulic load.

In addition, in some examples, the power system 100 may include a muffler 110. In some such examples, the muffler 110 may function as an exhaust of the engine 104. The example power system 100 may include other components not specifically discussed herein, or may omit one or more of the components discussed herein. The components of the power system 100 may be arranged within the enclosure 102 in any suitable configuration.

Figure 2:
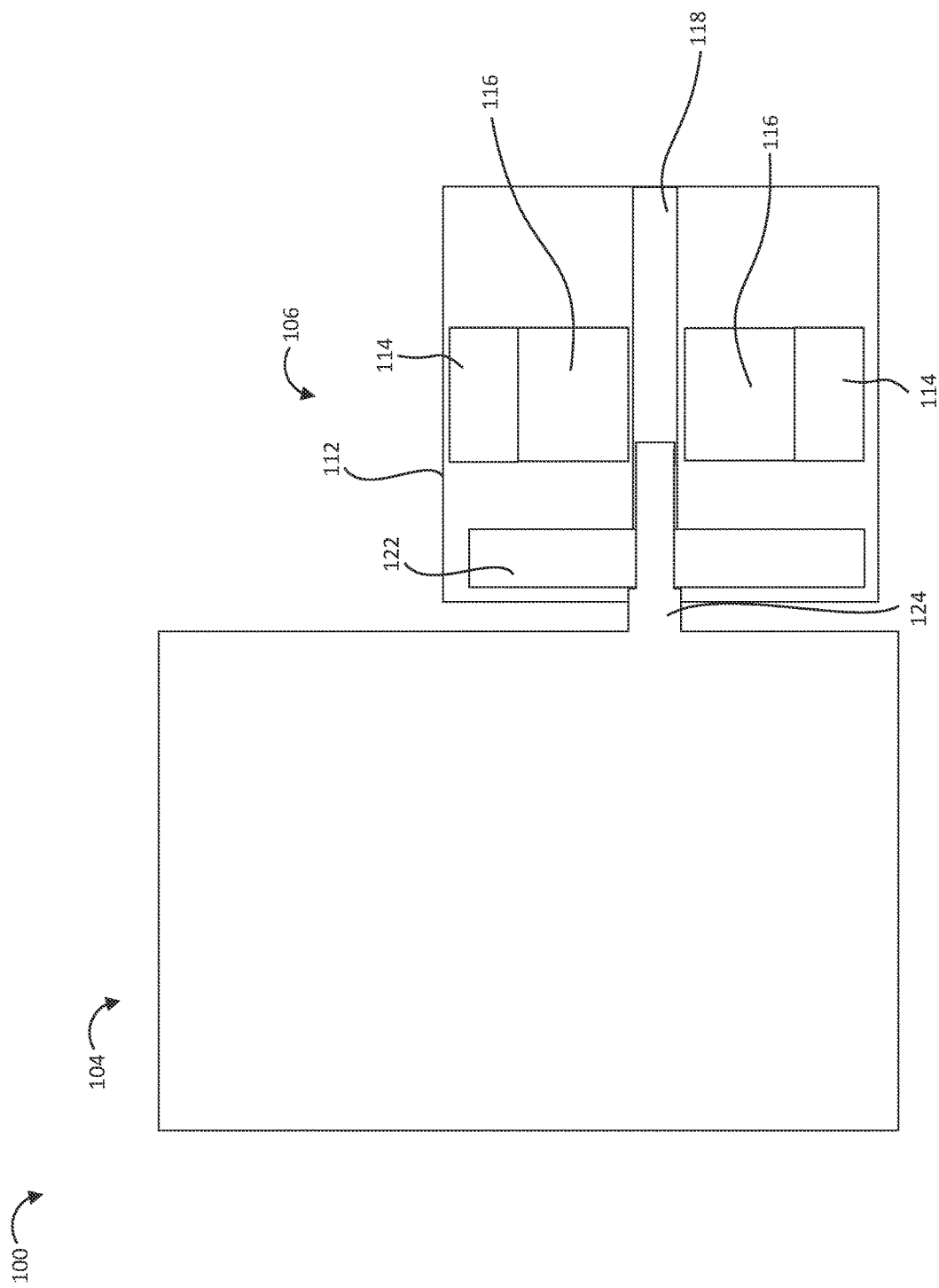
FIG. 2 is a block diagram of selected components of the power system of FIG. 1, showing an engine, a generator, and a fan, in accordance with aspects of this disclosure.

FIG. 2 is a block diagram of selected components of the power system 100 of FIG. 1, showing the engine 104, the generator 106, and a fan 122. Various components of the power system 100 illustrated in FIG. 1 are omitted from FIG. 2 for clarity and ease of understanding. The generator 106 includes a rotor assembly 116 and a stator assembly 114. As shown, the rotor assembly 116 is coupled to a rotor shaft 118 (e.g., arranged about the rotor shaft 118). As illustrated in FIG. 2, the rotor shaft 118 is coupled to the engine 104 via a drive connection (e.g., a threaded connection). For example, the rotor shaft 118 may include a first aperture (e.g., first aperture 138 illustrated in FIG. 3) configured to receive an engine shaft 124 of the engine 104. The engine 104 is configured to output mechanical power via the engine shaft 124. The output mechanical power drives the rotor assembly 116 relative to the stator assembly 114 to generate electrical power.

In some examples, one of more components of the generator 106 can be entirely or partially enclosed within a housing 112. In some examples, the housing 112 includes one or more pieces configured to connect the generator to the engine, connect the generator to the enclosure and/or support structure for physical support, provide support for a rotor shaft, and/or provide a cooling airflow pathway around the stator and/or rotor assemblies. In other examples, the generator 106 may omit a housing.

The power system 100 also includes a fan 122. The fan 122 directs air through the enclosure 102. The fan 122 is driven by rotation of the engine shaft 124 and/or the rotor shaft 118. In some examples, movement of the fan 122 draws in air into the interior of the housing 112. The air directed into the housing 112 by the fan 122 cools the rotor assembly 116 and/or the stator assembly 114 of the generator 106. In some examples, the air may flow through one or more pathways internal to the generator 106. For example, air may be drawn through a gap between windings 120 and the rotor assembly 116, through an outer channel on the housing 112, through the rotor assembly 116 (e.g., windings of the rotor assembly 116), through the stator assembly 114 (e.g., windings of the stator assembly 114), and/or any additional airflow pathways that are present in the generator 106. The air can enter and exit the housing 112 at any number of locations, openings, gratings, etc.

Figure 3:
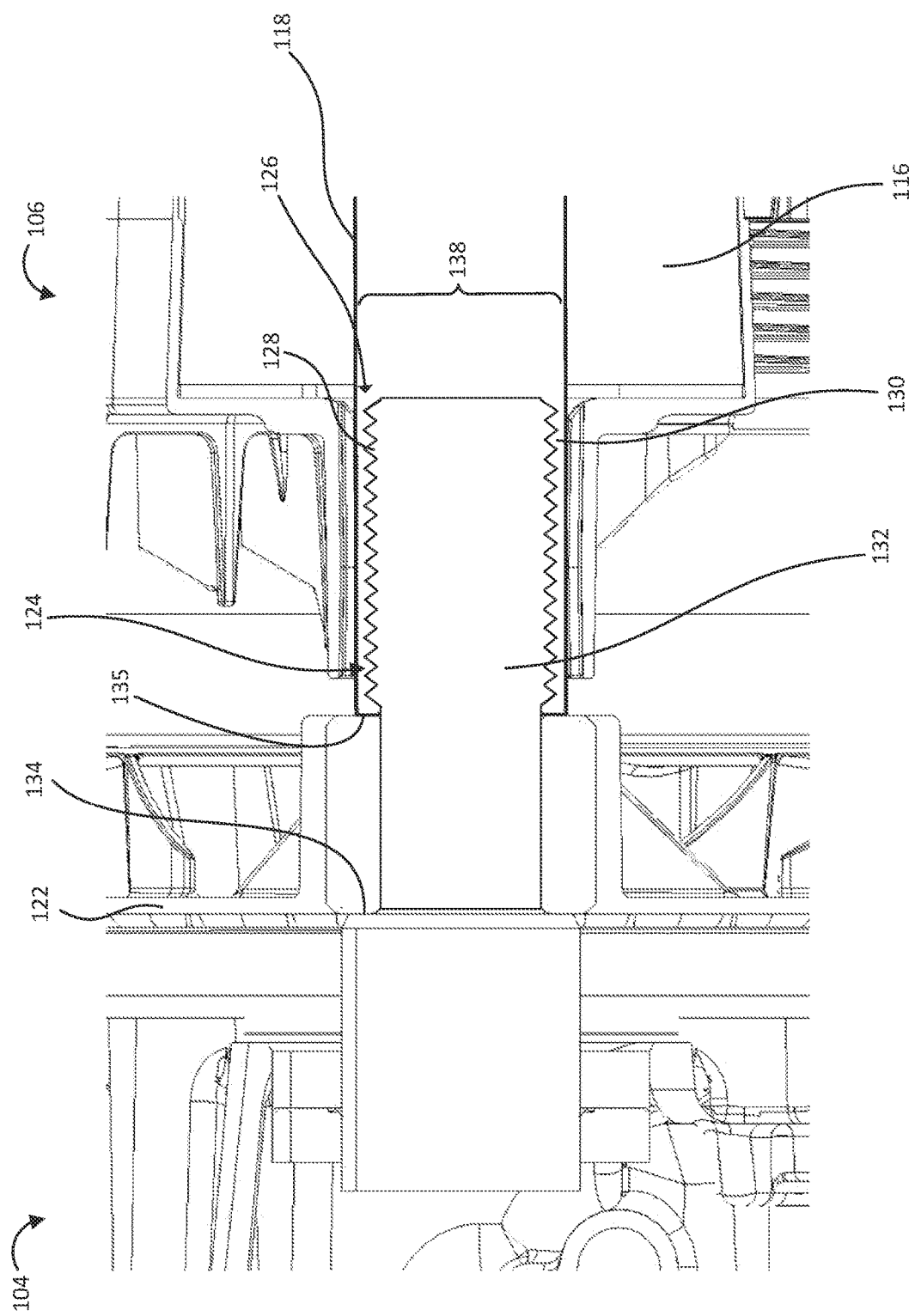
FIG. 3 is an enlarged view of selected components of the power system illustrated in FIG. 2, in accordance with aspects of this disclosure.
Figure 4:
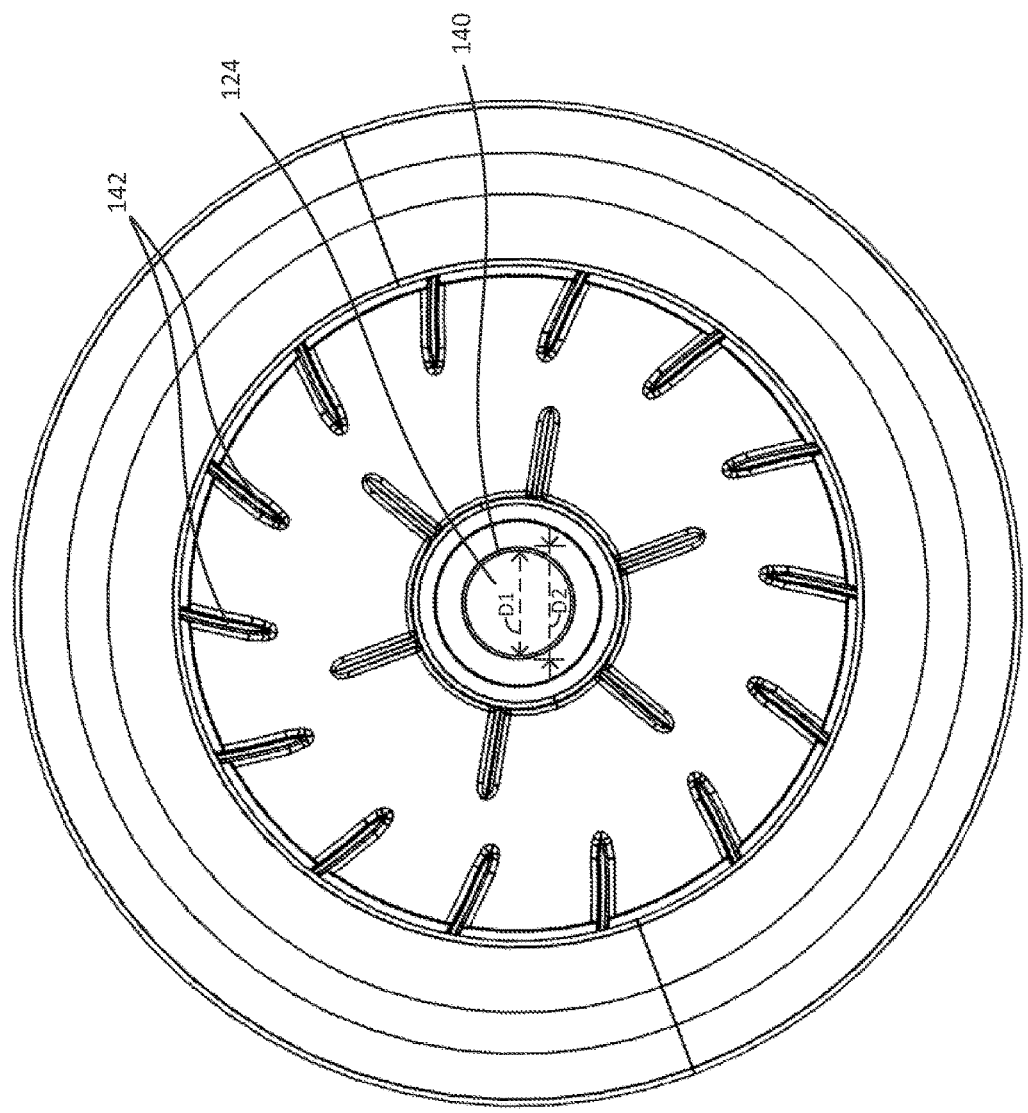
FIG. 4 is a front view of a fan and an engine shaft of the example power system of FIG. 2, in accordance with aspects of this disclosure.

FIG. 3 is an enlarged view of selected components of the power system 100 illustrated in FIG. 2. FIG. 4 is a front view of the fan 122 and the engine shaft 124 of the example power system 100 of FIG. 2. As shown, FIG. 3 illustrates a threaded connection 126 between an outer diameter thread (e.g., a male thread) 128 and an inner diameter thread (e.g., a female thread) 130. FIG. 3 illustrates the engine shaft 124 having the outer diameter thread 128 and the rotor shaft 118 having the inner diameter thread 130. For example, the engine shaft 124 may include an elongate portion 132 having the outer diameter threads 128 and the rotor shaft 118 may define a first aperture 138 with the inner diameter threads 130. In this way, the inner diameter threads 130 of the first aperture 138 are configured to receive the outer diameter threads 128 of the elongate portion 132 of the engine shaft 124 to form the threaded connection 126. The threaded connection 126 couples the engine shaft 124 to the rotor assembly 116 such that the engine shaft 124 turns the rotor shaft 118.

In other examples, however, the threaded connection 126 may have a different configuration. For example, the threaded connection 126 may be between an outer diameter thread of a bolt and an inner diameter thread of an aperture configured to receive the bolt. As one example, the example power system 100 may include a bolt configured to extend from the rotor shaft 118 to an aperture in the engine shaft 124 configured to receive the bolt. In other examples, the bolt and aperture configured to receive the bolt may be configured in a different way. In yet other examples, the power system 100 may include a different threaded connection or another type of coupling between the engine shaft 124 and the rotor shaft 118.

The fan 122 disclosed herein is coupled to the engine shaft 124 via a clearance fit (e.g., a fit in which the fan 122 and engine shaft 124 may slide and/or rotate relative to one another when assembled). For example, the fan 122 has a second aperture 140 configured to receive the engine shaft 124. For the clearance fit between the second aperture 140 of the fan 122 and the engine shaft 124, a first diameter D1 of the engine shaft 124 is slightly smaller than the second diameter D2 of the second aperture 140, such that the fit between the fan 122 and the engine shaft is looser than that of a press fit of conventional power systems, but not so loose as to allow the fan 122 to rotate in an imbalanced manner or otherwise negatively interfere with the operation of the power system 100. Unlike the press fit of the fans of conventional power systems, the clearance fit between the second aperture 140 and the engine shaft 124 allows the fan 122 to be removably coupled to the engine shaft 124 without the use of tools. Moreover, the clearance fit between the fan 122 and the engine shaft 124 may lower the total assembly cost of the power system (e.g., no press needed to couple the fan 122 and the engine shaft 124), have less complex individual parts (e.g., less strict tolerances and less precise dimensions required), may be easier to assemble, be more serviceable (e.g., because the parts are removably coupled), and have less quality issues in manufacturing in comparison to conventional power systems.

In order for the fan 122 to rotate upon rotation of the engine shaft 124 and rotor shaft 118 without the use of the press fit of conventional power systems, the fan 122 is axially clamped between the engine shaft 124 and the rotor shaft 118. For example, when the engine shaft 124 and the rotor shaft 118 are coupled together via the threaded connection 126, the fan 122 is compressed between the engine shaft 124 and the rotor shaft 118 in the axial direction (e.g., a direction substantially aligned with a length of the engine shaft 124 and/or the rotor shaft 118). In some cases, the threaded connection 126 is configured to tighten when the engine shaft 124 turns the rotor shaft 118 during operation, thereby further increasing the axial compression on the fan 122. Thus, as the power system 100 operates, the fan 122 remains tightly clamped between the engine shaft 124 and the rotor shaft 118. In this way, the fan 122 does not rotate independently of the engine shaft 124 or rotor shaft 118 when the axial compression is applied to the fan 122. Instead, the fan 122 rotates to generate an airflow through the generator 106 when the engine shaft 124 turns the rotor shaft 118.

The fan 122 may be axially clamped between the engine shaft 124 and the rotor shaft in any suitable manner. In some examples, the fan 122 may be clamped between a first abutting surface 134 of the engine shaft 124 and a second abutting surface 135 of the rotor shaft 118. In some such examples, the first abutting surface 134 and/or second abutting surface 135 may include a shoulder, a flange, a protrusion, axial end face, and/or any other surface(s) extending radially from the engine shaft 124 or rotor shaft 118, respectfully, to axially abut the fan 122. In this way, when the outer diameter threads 128 of the elongate portion 132 of the engine shaft 124 are threadably connected to the inner diameter threads 130 of the first aperture 138, the fan 122 is compressed between the first abutting surface 134 of the engine shaft 124 and the second abutting surface 135 of the rotor shaft 118. In some examples, the first abutting surface 134 may be tapered and the portion of the fan 122 configured to contact the tapered first abutting surface 134 may have a corresponding tapered surface. Additionally, or alternatively, the surface of the fan 122 and the second abutting surface 135 of the rotor shaft 118 that are in contact when the fan 122 is axially compressed may have corresponding tapered surfaces. In examples in which the abutting surfaces of the fan 122 and the first abutting surface 134 and/or the second abutting surface 135 have corresponding tapered interfaces, the tapered interfaces may help maintain the fan 122 in a desired position about the engine shaft 124.

In some examples, the rotor shaft 118 may include the outer diameter thread 128 and the engine shaft 124 may include the inner diameter thread 130. In such examples, the rotor shaft 118 may include the elongate portion having the outer diameter threads, and the engine shaft 124 may include the first aperture with the inner diameter threads. The first aperture of the engine shaft 124 may be configured to receive the outer diameter threads of the rotor shaft 118 to form the threaded connection. In such examples, the second aperture 140 of the fan 122 is configured to removably couple with the rotor shaft 118 via a clearance fit. In any case, when the fan 122 is compressed between the first abutting surface 134 of the engine shaft 124 and the second abutting surface 135 of the rotor shaft 118, the fan 122 is configured to rotate and generate airflow through the generator 106 when the engine shaft 124 turns the rotor shaft 118.

Figure 5:
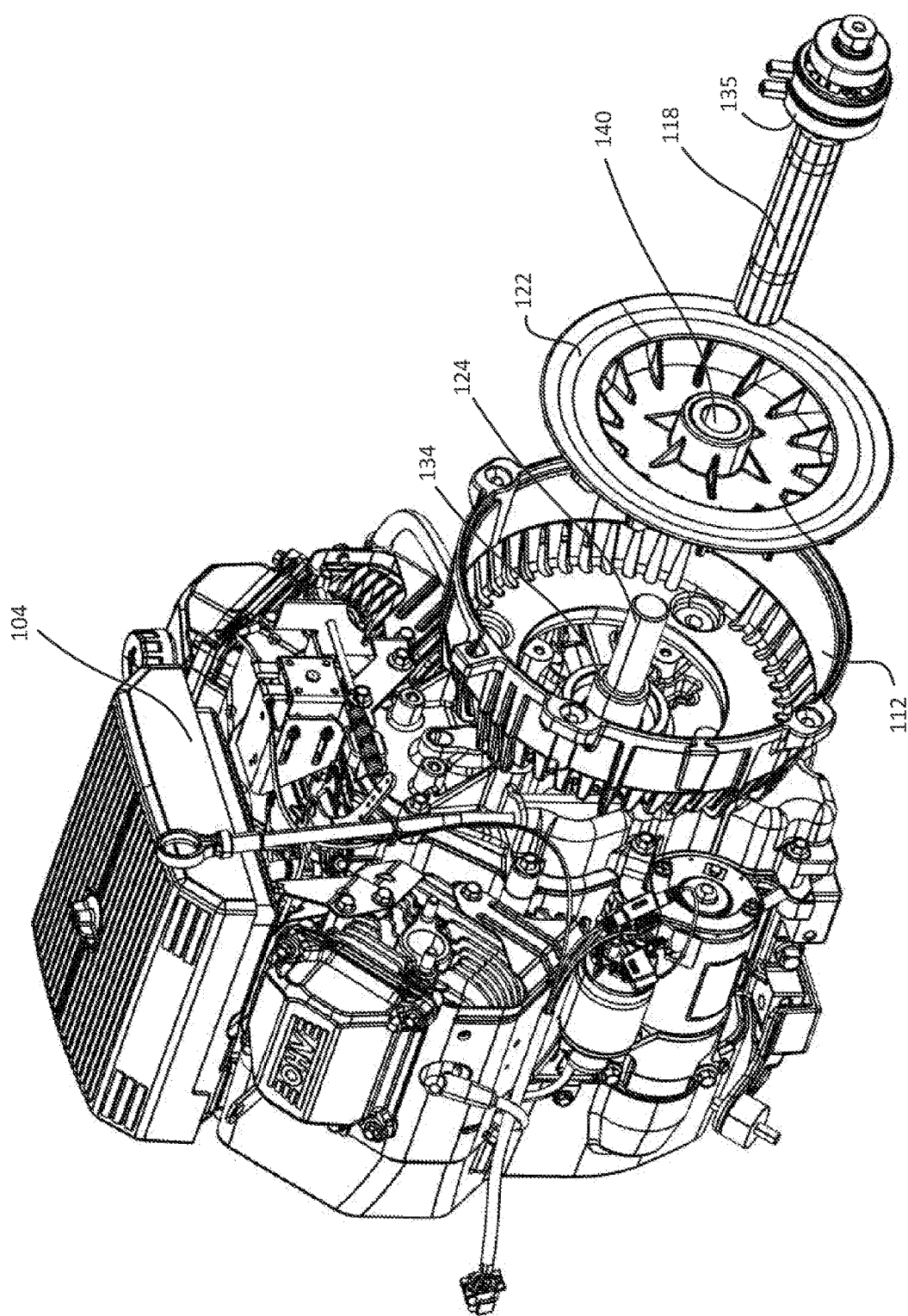
FIG. 5 is an exploded view of the fan, the engine including the engine shaft, and the rotor shaft of the example power system of FIG. 2, in accordance with aspects of this disclosure.

FIG. 5 is an exploded view of the fan 122, the engine 104 including the engine shaft 124, and the rotor shaft 118 of the example power system 100 of FIG. 2. As seen in FIG. 5, the second aperture 140 of the fan 122 receives the engine shaft 124. The first aperture 138 (not shown in FIG. 5) of the rotor shaft 118 receives the engine shaft 124. When the engine shaft 124 and the rotor shaft 118 are threadably connected to each other, the fan 122 is axially clamped between the first abutting surface 134 of the engine shaft 124 and the second abutting surface 135 of the rotor shaft 118. Other components are omitted from the view of FIG. 5 for clarity.

As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, systems, blocks, and/or other components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

What is claimed is:

1. A power system comprising:
an engine configured to output mechanical power via an engine shaft including an elongate portion;
a generator comprising a rotor shaft coupled to a rotor assembly and configured to be coupled to the engine shaft via a threaded connection in which one of the engine shaft or the rotor shaft comprises outer diameter threads and the other of the engine shaft or the rotor shaft comprises inner diameter threads; and
a fan comprising a first aperture configured to receive one of the engine shaft or the rotor shaft, the threaded connection configured to axially compress the fan between a first abutting surface of the one of the engine shaft and the rotor shaft having the inner diameter threads of the threaded connection and a second abutting surface on the one of the engine shaft or the rotor shaft having the outer diameter threads of the threaded connection, such that the fan rotates to generate an airflow through the generator when the engine shaft turns the rotor shaft,
wherein the rotor shaft defines a second aperture comprising the inner diameter threads and configured to receive the elongate portion of the engine shaft such that the fan is compressed between the first abutting surface and the second abutting surface.

2. The power system as defined in claim 1, wherein the elongate portion comprises the outer diameter threads and the second abutting surface.

3. The power system as defined in claim 2, wherein the second abutting surface comprises a shoulder or flange on the engine shaft.

4. The power system as defined in claim 1, wherein the rotor shaft comprises an elongate portion comprising the outer diameter threads and the second abutting surface.

5. The power system as defined in claim 4, wherein the second abutting surface comprises an axial end of the rotor shaft.

6. The power system as defined in claim 1, wherein the first aperture is configured to receive one of the engine shaft or the rotor shaft via a clearance fit.

7. The power system as defined in claim 1, wherein the threaded connection is configured to tighten when the engine shaft turns the rotor shaft, thereby increasing the axial compression on the fan.

8. The power system as defined in claim 1, wherein the fan does not rotate independently of the received engine shaft or rotor shaft when the axial compression is applied to the fan.

9. The power system as defined in claim 1, wherein at least one of the first abutting surface or the second abutting surface comprises a protrusion.

10. The power system as defined in claim 1, further comprising one or more of:
welding-type conversion circuitry configured to convert electrical power from the generator to welding-type power;
an air compressor coupled to at least one of the electrical power from the generator or the mechanical power from the engine and configured to output compressed air;
a hydraulic pump configured to generate hydraulic pressure from at least one of the electrical power from the generator or the mechanical power from the engine; or
auxiliary power conversion circuitry configured to convert the electrical power from the generator to at least one of AC output power or DC output power.

11. A power system comprising:
an engine configured to output mechanical power via an engine shaft including an elongate portion;
a generator comprising a rotor shaft coupled to a rotor assembly and configured to be coupled to the engine shaft via a threaded connection in which one of the engine shaft or the rotor shaft comprises an outer diameter thread and the other of the engine shaft or the rotor shaft comprises an inner diameter thread; and
a fan comprising a first aperture configured to receive one of the engine shaft or the rotor shaft, the threaded connection configured to axially compress the fan between a first abutting surface of the one of the engine shaft and the rotor shaft having the inner diameter threads of the threaded connection and a second abutting surface on the one of the engine shaft or the rotor shaft having the outer diameter threads of the threaded connection, such that the fan rotates to generate an airflow through the generator when the engine shaft turns the rotor shaft,
wherein the engine shaft defines a second aperture comprising the inner diameter threads and configured to receive the elongate portion of the rotor shaft such that the fan is compressed between the first abutting surface and the second abutting surface.

* * * * *